United States Patent
Karidi et al.

(10) Patent No.: US 10,275,795 B1
(45) Date of Patent: *Apr. 30, 2019

(54) SYSTEM AND METHOD FOR RANKING, ALLOCATION AND PRICING OF CONTENT RECOMMENDATIONS

(71) Applicant: Outbrain Inc., New York, NY (US)

(72) Inventors: Ron Karidi, Herzliya (IL); Yaron Galai, New York, NY (US)

(73) Assignee: Outbrain Inc., New York, NY (US)

( * ) Notice: Subject to any disclaimer, the term of this patent is extended or adjusted under 35 U.S.C. 154(b) by 327 days.

This patent is subject to a terminal disclaimer.

(21) Appl. No.: 14/055,291

(22) Filed: Oct. 16, 2013

(51) Int. Cl.
G06Q 30/02 (2012.01)

(52) U.S. Cl.
CPC ..... G06Q 30/0263 (2013.01); G06Q 30/0254 (2013.01)

(58) Field of Classification Search
None
See application file for complete search history.

(56) References Cited

U.S. PATENT DOCUMENTS

| | | | | |
|---|---|---|---|---|
| 8,170,913 B1* | 5/2012 | Baluja | G06Q 30/0238 | 705/14.38 |
| 8,423,405 B1* | 4/2013 | Gopalratnam | G06Q 30/00 | 705/14.4 |
| 8,527,333 B1* | 9/2013 | Chatterjee | G06Q 30/0241 | 705/14.1 |
| 2002/0062247 A1* | 5/2002 | Allen | G06Q 30/02 | 705/14.52 |
| 2003/0149937 A1* | 8/2003 | McElfresh | G06Q 30/02 | 715/210 |
| 2006/0253319 A1* | 11/2006 | Chayes | G06Q 30/02 | 705/14.52 |
| 2007/0055569 A1* | 3/2007 | Subramanian | G06Q 30/02 | 705/14.42 |
| 2007/0078958 A1* | 4/2007 | Bennett | G06Q 10/04 | 709/223 |
| 2008/0294524 A1* | 11/2008 | Badros | G06Q 30/02 | 705/14.54 |
| 2009/0210287 A1* | 8/2009 | Chickering | G06Q 30/02 | 705/14.71 |
| 2009/0248513 A1* | 10/2009 | Aggarwal | G06Q 30/02 | 705/14.72 |
| 2010/0070350 A1* | 3/2010 | Paunikar | G06Q 30/02 | 705/14.1 |
| 2010/0198695 A1* | 8/2010 | Muthukrishnan | G06Q 30/02 | 705/14.71 |
| 2010/0306161 A1* | 12/2010 | Chen | G06N 7/005 | 706/52 |
| 2011/0231248 A1* | 9/2011 | Vee | G06Q 30/00 | 705/14.45 |

(Continued)

*Primary Examiner* — Michael W Schmucker
*Assistant Examiner* — Bion A Shelden
(74) *Attorney, Agent, or Firm* — Lowenstein Sandler LLP (57) ABSTRACT

A server computer system receives campaign data from one or more content providers. The server computer system determines assignments of recommendation opportunities in documents to recommendations based on the campaign data. The server computer system ranks the recommendations based on the assignments, allocates the recommendations to the documents based on the rankings of the recommendation opportunities, and determines pricing for the recommendations based on the allocations.

11 Claims, 7 Drawing Sheets

(56) References Cited

U.S. PATENT DOCUMENTS

| | | | |
|---|---|---|---|
| 2012/0030012 A1* | 2/2012 | Fisher | G06Q 30/0241 |
| | | | 705/14.46 |
| 2013/0166395 A1* | 6/2013 | Vassilvitskii | G06Q 30/0244 |
| | | | 705/14.73 |
| 2014/0058793 A1* | 2/2014 | Nath | G06Q 30/08 |
| | | | 705/7.31 |
| 2014/0109123 A1* | 4/2014 | Balakrishnan | H04N 21/44222 |
| | | | 725/14 |
| 2014/0207564 A1* | 7/2014 | Dubey | G06Q 30/02 |
| | | | 705/14.43 |
| 2015/0006280 A1* | 1/2015 | Ruiz | G06Q 30/00 |
| | | | 705/14.45 |
| 2015/0088955 A1* | 3/2015 | Hendrick | G06Q 30/02 |
| | | | 709/201 |

* cited by examiner

SYSTEM AND METHOD FOR RANKING, ALLOCATION AND PRICING OF CONTENT RECOMMENDATIONS

TECHNICAL FIELD

The present disclosure relates to content recommendations and, more particularly, to a technique of ranking, allocating and pricing content recommendations.

BACKGROUND

In the digital advertising industry, the onus of revenue-generating activity is shifting from selling interruptive and irrelevant advertisements to providing integrated high-quality content that is interesting, helpful and trustworthy to readers. The digital advertisement industry has not kept pace with this paradigm shift, and digital solutions that natively support content marketing are lacking. Traditionally, content providers place bids to have their content placed as recommendations on various websites. In general, bidding platforms promise to allocate content to the highest bidder on an impression-by-impression basis. Some conventional bidding platforms use Generalized Second Prize (GSP) to position the buyer bidding the highest first in the bidding queue. The buyer (e.g., content provider) thereupon pays the price suggested by the second highest bid. Traditional bidding platforms do not offer means to determine balanced ranking, allocation and pricing of content recommendations.

BRIEF DESCRIPTION OF THE DRAWINGS

The present disclosure will be understood more fully from the detailed description given below and from the accompanying drawings of various implementations of the disclosure.

DETAILED DESCRIPTION

A system and method for ranking, allocating and pricing recommendations is described, according to various implementations. Content providers may wish to have their content distributed as recommendations on various destination documents. A content recommendation or recommendation hereinafter refers to a representation of digital content. A recommendation can include one or more text, links, thumbnails, images, icons, etc. A document hereinafter refers to webpage, a mobile application graphical user interface (GUI), etc. For example, a web blogger, John Smith, may wish to have his web blog post of his analysis of a baseball game to be included as a recommendation for users that are accessing a publisher's (for e.g. SportsNews, Inc.) webpage describing the highlights of the same baseball game. An impression hereinafter refers to an instance of populating a destination document (e.g., webpage, mobile application GUI) with a content recommendation. For example, the web blog post of John Smith may be an impression if the web blog post is served as a recommendation on the SportsNews, Inc. webpage.

The content provider (e.g., web blogger John Smith) may use a third party recommendation service provider to serve his content to various destination documents. The content provider can specify to the third party recommendation server a budget and/or the cost-per-click (CPC) the content provider is willing to pay for the service. "Content provider" is hereinafter also referred to as "buyer." The CPC is the amount the buyer is willing to pay each time a content recommendation is selected. For example, the content provider may have a maximum budget of $800 and may be willing to pay a maximum CPC of $1.

Implementations dynamically provide balanced estimation, ranking, allocation and pricing of content recommendations. Implementations enable a variety of content recommendations to be served as impressions by ranking the content recommendations, determining an optimal allocation of which content should be served as the impressions for various destinations documents (e.g., webpages, mobile applications user interfaces, etc.) based on the rankings, and by determining an optimal price a content provider should pay based on the allocations, while taking into account the parameters (e.g., budget, CPC) that are specified by the content provider. Implementations can dynamically determine the optimal ranking, allocation and pricing of recommendations and can dynamically adjust the optimal ranking, allocation and pricing based on real-time data.

Figure 1:
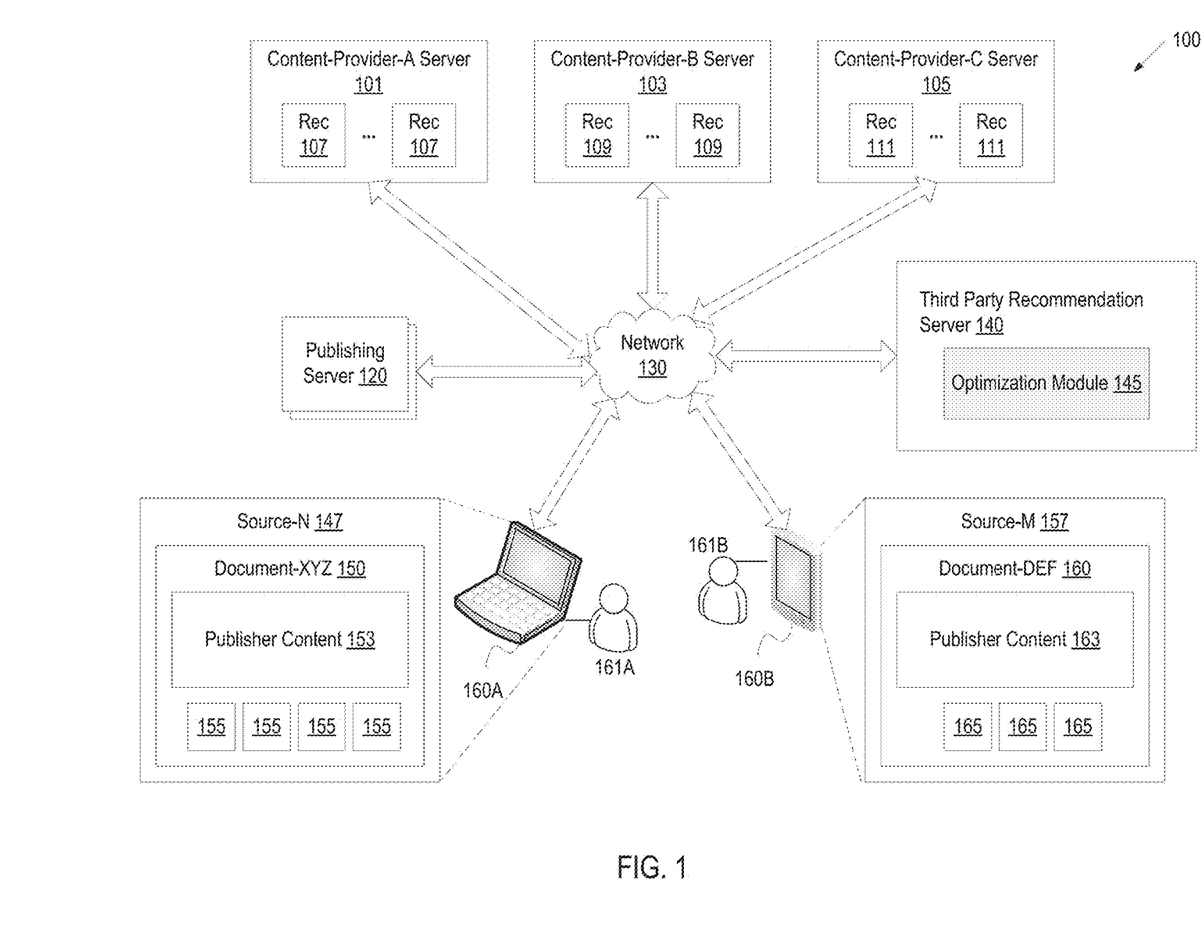
FIG. 1 illustrates an example system architecture in which examples of the present disclosure can be implemented.

FIG. 1 illustrates an example system architecture 100 in which examples of the present disclosure can be implemented. The system architecture 100 can include one or more user devices 160A-B, one or more content provider servers 101,103,105, one or more destination servers (e.g., publishing servers 120) and one or more third party recommendation servers 140 coupled to each other over one or more networks 130.

Content providers may have recommendations (e.g., recommendations 107,109,111) they wish to have displayed, for example, in a publisher document (e.g., document 150, 160). A document 150,160 may be for example, and is not limited to a website homepage, section front, webpage, mobile application user interface (UI), gaming application UI, television application UI, etc. For example, content provider web blogger John Smith may have multiple recommendations 107 of various web blog posts and may wish to have the recommendations 107 served in document 150 (e.g., SportsNews webpage) and/or document 160 (e.g., BaseballNews website). A recommendation 107,109,111 can be a representation of digital content. Digital content can include, for example, such as, and not limited to, an article, a web blog entry, a social media posting, a data feed, an advertisement, a document (e.g., webpage), digital video, digital movies, digital photos, digital music, social media updates, electronic books (ebooks), electronic magazines, digital newspapers, digital audio books, electronic journals, electronic comic books, software applications, etc. Each content provider can have multiple recommendations 107, 109,111.

A content recommendation host or "publisher" hereinafter refers to an entity and platform hosting destination documents (e.g., webpages, mobile application graphical user interfaces (GUIs), gaming application GUIs, television application GUIs, etc.) that include recommendations 107, 109,111 of the content providers. For example, SportsNews, Inc. and BaseballNews, Inc. may be publishers. The publisher platforms can include publishing servers 120. The publisher servers 120 can be application servers that provide one or more applications (e.g., web application, mobile application, desktop application, gaming console applications, television console application, etc.). The publishing servers 120 can be coupled to one or more data stores that store publisher data and/or recommendations of content providers.

The publishers' destination documents 150,160 can be rendered with the recommendations 107,109,111 of the content providers in user devices 160A-B using for example, an application (e.g., web browser, mobile application, desktop application, gaming application, television application, etc.) on the user device 160A-B.

A document 150,160 can be within a source 147,157. The source 147,157 can be for example, and is not limited to, a publisher's website, a publisher's mobile application, publisher's gaming application, publisher's television application, etc. A destination document 150,160 can include publisher content (e.g., publisher content 153,163). For example, the SportsNews website (e.g., source 147) can include a webpage (e.g., document 150) that contains an article about a baseball game (e.g., publisher content 153).

The publisher destination documents 150,160 can be configured with one or more recommendation opportunities 155,165, which can be populated with recommendations 107,109,111. For example, a document 150 (e.g., SportsNews webpage) may have four recommendation opportunities 155 and a document 160 (e.g. BaseballNews mobile application GUI) may have three recommendation opportunities 165. The recommendation opportunities 155,165 may be populated with recommendations 107,109,111 from one or more content providers' servers 101,103,105.

The content providers may wish to publish their respective recommendations 107,109,111 in widespread locations (e.g., document 150, document 160). The content providers can use the service hosted by the third party recommendation service provider to have the recommendations 107,109, 111 of the content providers served to populate the recommendation opportunities 155,165 in the publisher documents 150,160. The publishers (e.g., SportsNews Inc., BaseballNews, Inc.) can use the service hosted by the third party recommendation service provider to receive recommendations 107,109,111 to populate the recommendation opportunities 155,165 in their respective publisher documents 150,160.

The content providers may purchase campaigns from the third party recommendation service provider. The campaigns provide recommendations 107,109,111 from the content providers to one or more destination documents 150,160 in accordance with criteria selected by the content provider and parameters of the documents 150,160 set by the publishers. The destination documents 150,160 may have parameters defining the scope of which recommendations 107,109,111 may be included in the destination documents 150,160. For example, the parameters can include, and are not limited to, category (e.g., news), sub-category (e.g., international news), country, platform, language, etc.

The content providers may specify parameters for the campaign, such as, and not limited to, a maximum budget (B) of what the content provider is willing to pay for the campaign and the maximum CPC that the content provider is willing to pay each time users (e.g., users 161A,B) select a recommendation.

The third party recommendation service provider can host one or more third party recommendation servers 140 to provide the service to the content providers and publishers. The servers 140 can include an optimization module 145 to determine an optimal allocation of which content provider recommendations 107,109,111 should be served as impressions to populate the recommendation opportunities 155,165 in the documents 150,160 while taking into account the campaign parameters, the document parameters, and the likelihood that the impressions would be selected by users 161A-B and provide high user-engagement while generating click-through revenue. The publishers (e.g., SportsNews Inc., BaseballNews, Inc.) may wish to include impressions in their respective documents 150,160 that are of sufficiently high quality while providing a substantial income stream in return for hosting the recommendations. The optimization module 145 can select the recommendations 107,109,111 to be served which meet the criteria of the content providers and publishers. The optimization module 145 can select the recommendations 107,109,111 that provide the most valued content while still providing substantial overall revenue and increasing user-engagement throughout the network.

The network of content providers can include, for example, several hundred thousand recommendations 107, 109,111 that may be stored in one or more data stores that are coupled to the network 130. The architecture 100 can include, for example, several hundred publisher documents 150,160 that are accessed by multiple users 161A-B on various user devices 160A-B.

For example, document 150 may have four recommendation opportunities 155. When a particular user (e.g., user 161A) accesses the particular document 150, the optimization module 145 can determine which set of recommendations 107,109,111 should be served as impressions to populate the four recommendation opportunities 155 in the document 150. As each user 161A-B accesses a document 150,160, the optimization module 145 can determine which set of recommendations 107,109,111 should be served for the particular user and document combination.

The click-through rate (CTR) is the estimated probability (calculated as a percentage) that a user 161A-B will select the recommendation if the recommendation populates a recommendation opportunity in a destination document. The CTR can be determined from user activity data that is stored in one or more data stores that a coupled to the network 130.

The data stores can be persistent storage units coupled to the network 130. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The networks 130 can include one or more local area networks (LAN), one or more wireless networks, one or more mobile communications networks, one or more wide area networks (WAN), such as the Internet, or similar communication systems, or combinations of such. The networks 130 can include one or more networking and/or computing devices such as wired and wireless devices. In one implementation, not all servers 101,103,105,120,140, and/or user devices 160A-B are directly connected to each other. The networks 130 may be separate networks.

The servers 101,103,105,120,140 can be hosted on one or more machines. The machines can include for example, and are not limited to, any data processing device, such as a desktop computer, a laptop computer, a mainframe computer, a personal digital assistant, a server computer, a handheld device or any other device configured to process data.

A user device 160A-B can be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. For example, user device 160A may be a laptop computer and user device 160B may be a tablet computer.

Figure 2:
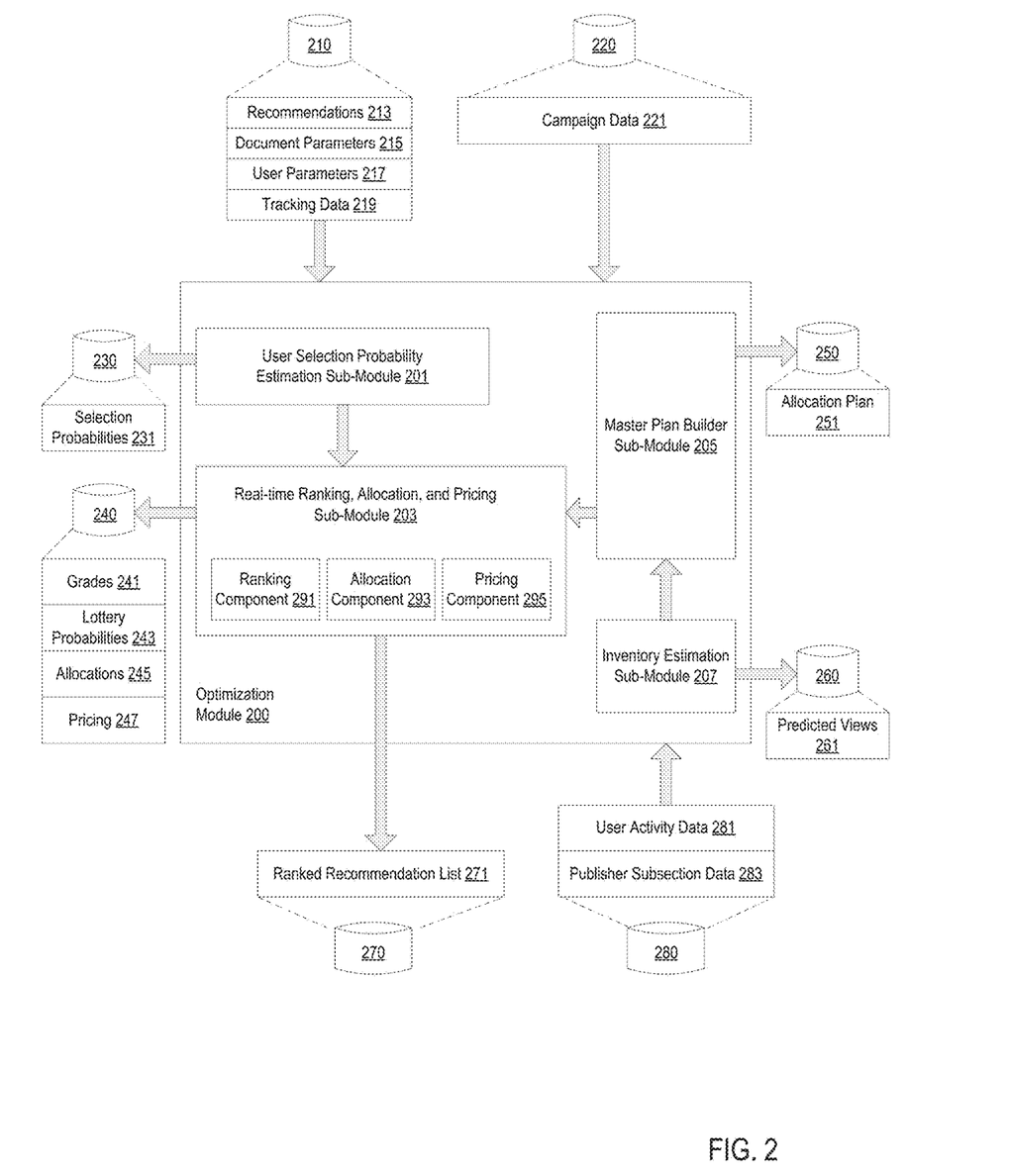
FIG. 2 is a block diagram of an optimization module, in accordance with various implementations.

FIG. 2 is a block diagram of an optimization module 200, in accordance with various implementations. The optimization module 200 can be the same as the optimization module 145 in FIG. 1. The optimization module 200 can include a user selection probability estimation sub-module 201, a real-time ranking, allocation and pricing sub-module 203, a master plan builder sub-module 205, and an inventory estimation sub-module 207. Note that in alternative implementations, the functionality of one or more of the user selection probability estimation sub-module 201, the real-time allocation, ranking and pricing sub-module 203, the master plan builder sub-module 205, and the inventory estimation sub-module 207 are combined or divided. Note that in alternative implementations, the functionality of the optimization module 200 can be separate modules.

The optimization module 200 can be coupled to one or more data stores 210,220,230,250,260,270,280 that store data. The data stores 210,220,230,250,260,270,280 can be persistent storage units. A persistent storage unit can be a local storage unit or a remote storage unit. Persistent storage units can be a magnetic storage unit, optical storage unit, solid-state storage unit, electronic storage units (main memory), or similar storage unit. Persistent storage units can be a monolithic device or a distributed set of devices. A 'set', as used herein, refers to any positive whole number of items.

The data stores 210,220,230,250,260,270,280 can store input and/or output data. The modules (e.g., user selection probability estimation sub-module 201, the real-time ranking, allocation and pricing sub-module 203, the master plan builder sub-module 205, and the inventory estimation sub-module 207) can be coupled to the one or more data stores 210,220,230,250,260,270,280 and can read from and write to the one or more data stores 210,220,230,250,260,270,280.

Data store 210 can store recommendations 213 and document parameters 215. The recommendations 213 can be provided by content providers. A recommendation 213 is a representation of digital content. A recommendation 213 can include, for example, and is not limited to, one or more text, links, thumbnails, images, icons, etc.

The document parameters 215 can describe parameters for publisher documents (e.g., documents 150,160 in FIG. 1). The document parameters 215 can be different for the documents of the various publishers and/or for the various documents. The document parameters 215 can describe, for example, the number of recommendation opportunities (e.g., recommendation opportunities 155,165 in FIG. 1) for each destination document. The document parameters 215 describe which the types of recommendations 213 that are eligible to be served as impressions to populate the recommendation opportunities in the documents. Other examples of document parameters 215 can include, for example, and are not limited to language, country, device platform, application operating system platform, etc. For example, the document parameters 215 for Document-XYZ may indicate that recommendations 213 for the mobile device platform and the English language may populate the recommendation opportunities in Document-XYZ.

Data store 220 can store campaign data 221. The campaign data 221 can be provided by multiple content providers. The campaign data 221 can include parameters, such as, and not limited to, identifiers of the content for use by the campaign, a total budget (B) for the campaign, the maximum cost per click (CPC) for the campaign, the desired average CPC for the campaign, and links to the recommendations for use by the campaign, etc. For example, the data store 210 may store one hundred recommendations (e.g., Recommendation-1 to Recommendation-100) for Content-Provider-A. The campaign data 221 for Content-Provider-A may specify twenty recommendation identifiers out of the one hundred recommendations that should be used by Campaign-A, links to the twenty recommendations, a total budget B of $1,000 for Campaign-A, a maximum CPC of $1 for Campaign-A and a desired average CPC of 70 cents for Campaign A.

The inventory estimation sub-module 207 can determine the expected number of views for the various destination documents (e.g., documents 150,160 in FIG. 1). For example, the inventory estimation sub-module 207 may predict that Document-XYZ may have 1 million views per day. In another example, the inventory estimation sub-module 207 may predict that Document-DEF may have 10 million views per day. The inventory estimation sub-module 207 can use the user activity data 281 stored in a data store 280 that is coupled to the optimization module 200, one or more prediction models, statistical analysis, etc. to determine the expected number of views for a document. The prediction models can be stored in data store 280. The user activity data 281 can include historical data that can be used to determine the expected number of views for a destination document. The inventory estimation sub-module 207 can store the expected number of views (e.g., predicted views 261) for the various documents in the data store 260.

In one implementation, the inventory estimation sub-module 207 can predict the number of views for a destination document based on data for the subsections of a publisher network. The inventory estimation sub-module 207 can identify a subsection of the publisher network using publisher subsection data 283. The publisher subsection data 283 can group documents of the various publishers based on one or more attributes, such as, and not limited to, category and sub-category. A category can include one or more sub-categories. An example of a category can include, and is not limited to news, and an example of a sub-category for news can include, and is not limited to, international news. The publisher subsection data 283 can assign the documents of the various publishers to one or more categories and/or sub-categories. The assignments can be based on user (e.g., system administrator, content provider administrator) input. In one implementation, the inventory estimation sub-module 207 can predict the number of views for a destination document based on an average number of views of documents in the same category and/or sub-category as the destination document. For example, Document-XYZ may be in the news category and the sports news sub-category. The average number of views for the documents in the subsection of sports news in the publisher network may be 500,0000 views per day, and the inventory estimation sub-module 207 may predict that Document-XYZ will have 500,0000 views per day.

The optimization module 200 may collect registration information, personal information, and/or demographic information pertaining to users and/or groups of users (e.g., age of user groups, geography (e.g., country, state, city) of user groups) and may store the information in one or more data stores (e.g., hard disks, memories, databases, etc.) (e.g., data store 210,280). In situations in which the implementations discussed herein collect personal information and/or demographic about users, or may make use of personal information and/or demographic information, the user may be provided with an opportunity to control whether the optimization module 200 is allowed collect the information (e.g., information about a user's social network, social actions or activities, profession, a user's preferences, or a user's current location), or to control whether and/or how to receive content from the content sharing platform that may be more relevant to the user. In addition, certain data may be treated in one or more ways before it is stored or used, so that personally identifiable information is removed. Thus, the user may have control over how, when, and what type of information is collected about the user and used by the optimization module 200.

The master plan builder sub-module 205 can generate an allocation plan 551. The master plan builder sub-module 205 can use the number of predicted views 261, the number of recommendation opportunities (e.g., recommendation opportunities 155 in FIG. 1) for each destination document (e.g., Document-XYZ 150 in FIG. 1) as specified in the document parameters 215, other document parameters (e.g., language, country, device platform, application operating system platform, etc.) specified in the document parameters 215, and the campaign data 221 to generate an allocation plan 251. The master plan builder sub-module 205 can also use the historical data accumulated in the data stores 230 and 240. The master plan builder sub-module 205 can store the allocation plan 251 in the data store 250. The allocation plan 251 is a plan for the aggregate of the campaign data 221 from the content providers. The allocation plan 251 can indicate the desired number of impressions for the recommendations 213 for the various destination documents. An impression is an instance of populating a destination document (e.g., webpage, mobile application GUI) (e.g., Document-XYZ in FIG. 1) with a content recommendation 213 (e.g., recommendations 107,109,11 in FIG. 1). The allocation plan 251 can include quotas at the recommendation level. For example, Content-Provider-A may have Recommendation-1 (e.g., online article) as part of Campaign-A. The allocation plan 251 may indicate that "15,000 impressions" on Document-XYZ should be allocated to Recommendation-1 based on the document parameters 215 (e.g., language, country, device platform, application operating system platform, number of recommendation opportunities, etc.) for Document-XYZ. Implementations of creating an allocation plan are described in greater detail below in conjunction with FIG. 4 and FIG. 5.

The user selection probability estimation sub-module 201 can determine selection probabilities 231 for recommendations 213 and can store the selection probabilities 231 in the data store 230. The selection probability 231 is the likelihood that a user (e.g., user 161A in FIG. 1) may select an impression of a recommendation 213 that populates a recommendation opportunity (e.g., opportunity 155 in FIG. 1) in a destination document (e.g., Document-XYZ 150 in FIG. 1) within the context, for example, of the user's current session with the destination document. For example, User-Jane-Doe may view destination Document-XYZ to read a new book review. The user selection probability estimation sub-module 201 can estimate how likely User-Jane-Doe will select a recommendation 213 if the recommendation 213 is served as an impression on Document-XYZ within the context of User-Jane-Doe reading the book review. For example, the user selection probability estimation sub-module 201 may determine that Recommendation-1 has a selection probability 231 of 5%, Recommendation-2 has a selection probability 231 of 2%, Recommendation-3 has a selection probability 231 of 60%, etc.

The user selection probability estimation sub-module 201 can use the user parameters 217 for the particular user (e.g., User-Jane-Doe) stored in the data store 210, prediction models, and statistical analysis to determine the selection probability 231. The user parameters 217 can include, for example, and are not limited to, location information of the user, device information of the user, user preferences, user interests, etc. The user selection probability estimation sub-module 201 can also determine the selection probabilities 231 for impressions of recommendations that have not yet been served to destination documents.

The real-time ranking, allocation and pricing sub-module 203 can allocate the recommendations 213 to the destination documents based on a lottery. In one implementation, the real-time ranking, allocation and pricing sub-module 203 allocates the recommendations 217 to the destinations documents based on a lottery using the allocation plan 251 and the selection probabilities 231.

The real-time ranking, allocation and pricing sub-module 203 can include a ranking component 291, an allocation component 293, and a pricing component 295. The ranking component 291 can determine the grades 241 for the recommendations 213 in the allocation plan 251 and store the grades 241 in the data store 240. In one implementation, the ranking component 291 determines the grades 241 based on the selection probabilities 231 and the maximum CPC a buyer (e.g., content provider) is willing to pay. For example, the grade 241 for a recommendation 213 in the allocation plan 251 may be calculated as the product of the selection probability 231 for the recommendation 213 multiplied by the CPC for the recommendation 213. For example, Recommendation-1 may be assigned a grade 241 of "5" and Recommendation-2 may be assigned a grade 241 of '7'. In another example, the grades 241 may be calculated as the product of (selection probability)$^\alpha \times$(CPC)$^\beta$. In one implementation, $\alpha$ and $\beta$ are values selected by the ranking component 291, for example, based on configuration data that may be stored in a data store (e.g., data store 240). In one implementation, the optimization module 200 can be coupled to another system that determines the grades 241, which the real-time ranking, allocation and pricing sub-module 203 can access. The ranking component 291 can use alternative computations to determine the grades 241.

The allocation component 293 can use the grades 241 calculated by the ranking component 291 to derive the lottery probabilities 243 for the recommendations 213 in the allocation plan 251 based on the proportions of the grades 241. The allocation component 293 can process any set of grades 241 and is not limited to the grade calculations described above. The lottery probability 243 is the probability that a recommendation 213 in the allocation plan 251 may be selected for allocation to be served as an impression in a destination document. The lottery probabilities 243 can be stored in the data store 240. In one implementation, the allocation component 293 calculates the lottery probability 243 for each of the recommendations 213 in the allocation plan 251 as a proportion of the grade 241 of the particular recommendation 213 to the total of the grades 241 of the recommendations 213.

For brevity and simplicity, an example illustrating the calculation of the lottery probabilities 243 is described using two recommendations 213 in an allocation plan 251. For example, Recommendation-1 may be assigned a grade 241 of "5" and Recommendation-2 may be assigned a grade 241 of '7'. The total of the grades 241 is "12". The allocation component 293 may determine that Recommendation-1 has a lottery probability 243 of 5/12, and that Recommendation-2 has a lottery probability 243 of 7/12.

The allocation component 293 can determine the allocations 245 of the recommendations 213 based on the proportion of the grades (i.e., the lottery probabilities 251). The allocations 245 can be stored as an allocation order in the data store 240. For example, the allocation component 293 may select the recommendations 213 for allocation in order of lottery probability 243. For example, the recommendation 213 having the highest lottery probability 243 may be selected first, etc. The allocation component 293 can position the first selected recommendation 213 in the most favorable position (e.g., top) in the allocation order (e.g., allocations 245). The allocation component 93 can use the allocation plan 251, together with the grades 241, to determine the lottery probabilities 243. Recommendations 213 with high allocation plan priority can be assigned a higher lottery probability 243 than the one warranted by its respective grade 241. In one implementation, the allocation of recommendations 213 to positions on the document is performed by sequential lottery. For example, there may be two positions for recommendations, and Recommendation-A may have a lottery probability of 0.7, Recommendation-B may have a lottery probability of 0.2, and Recommendation-C may have a lottery probability of 0.1. The allocation component 293 can perform the lottery for position one, with the above lottery probabilities. For example, the lottery can select Recommendation A for position one. Then, the allocation component 293 can perform a second lottery for position two, which may select Recommendation-C (even though Recommendation-B has a higher lottery probability).

The pricing component 295 can determine the price (e.g., CPC) a buyer (e.g., content provider) should pay for a user selection of a recommendation 213 in the allocations 245. A buyer may specify a maximum CPC for a campaign in the campaign data 221. The price that is determined by the pricing component 295 may be less than or equal to the maximum CPC. The pricing component 295 can store the optimal pricing 247 in the data store 240. The pricing component 295 can also take into account the allocated position for the recommendation.

The allocation component 293 can allocate each of the recommendations 213 in the allocations 245 to a specific position to create a ranked recommendation list 271 and can store the ranked recommendation list 271 in the data store 270. The real-time ranking, allocation and pricing sub-module 203 can provide the ranked recommendation list 271 to a system (e.g., serving system) to serve the recommendations 213 to the servers hosting the destination documents, for example, based on the ranking order in the ranked recommendation list 271. For each recommendation 213 in the allocations 245, for example, the ranked recommendation list 271 can include, and is not limited to, a recommendation identifier, a rank identifier, a price, the associated content provider, etc.

Figure 3:
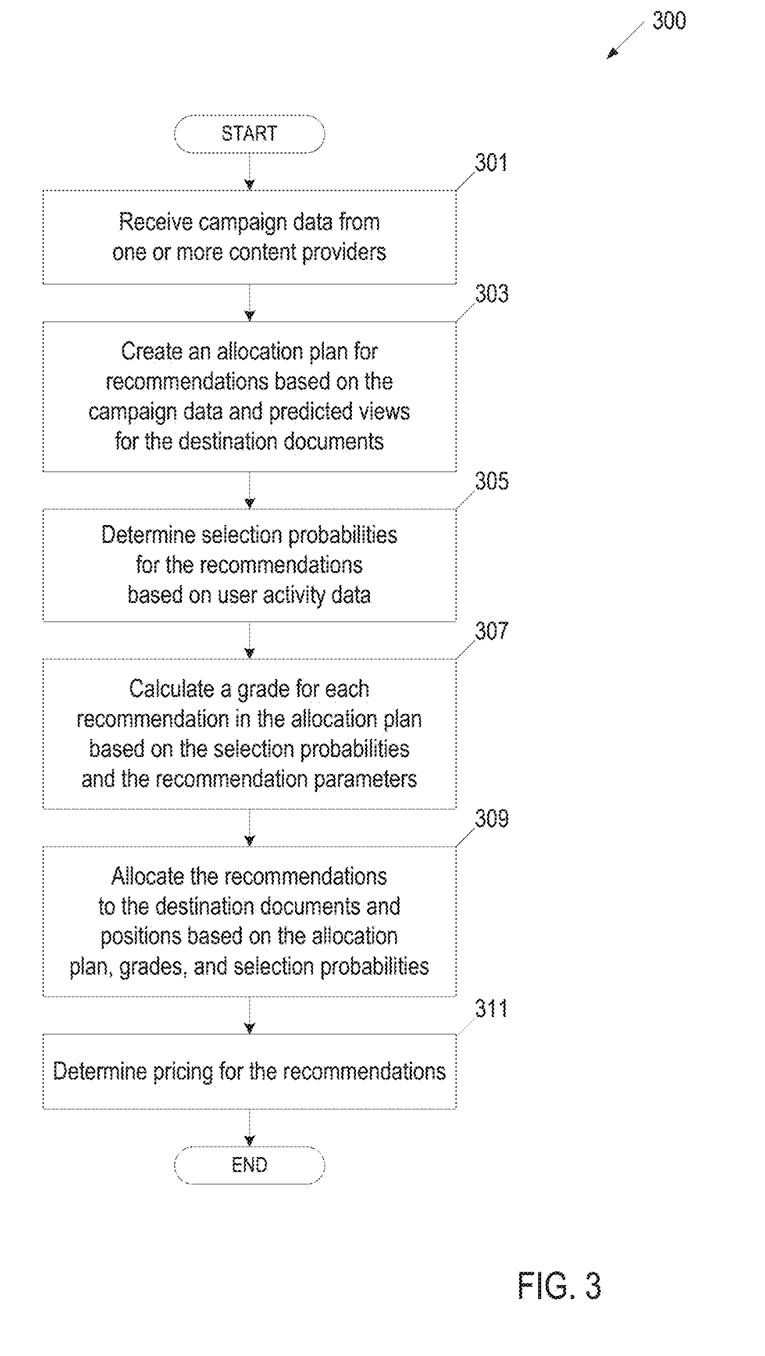
FIG. 3 is a flow diagram of an implementation of a method for ranking, allocating and pricing recommendations.

FIG. 3 is a flow diagram of an implementation of a method 300 for ranking, allocating and pricing recommendations. The method may be performed by processing logic that may comprise hardware (circuitry, dedicated logic, etc.), software (such as is run on a general purpose computer system or a dedicated machine), or a combination of both. In one implementation, the method 300 may be performed by the optimization module 145 hosted in a server 140 of FIG. 1 or by the optimization module 200 hosted in FIG. 2.

At block 301, the server receives campaign data from one or more content providers. For example, the server receives campaign data for a campaign from Content-Provider-A and campaign data for a campaign from Content-Provider-B. The campaign data can include parameters, such as, and are not limited to, identifiers of the recommendations for use by the campaign, a total budget (B) for the campaign, the maximum CPC for the campaign, the desired average CPC for the campaign, links to the recommendations for use by the campaign, etc. For example, the server may store fifty recommendations provided by Content-Provider-A, and the campaign data for Content-Provider-A may specify that twenty of those recommendations (e.g., online articles, web blogs, social network posts, data feeds, etc.) should be used in the campaign for Content-Provider-A.

At block 303, the server creates an allocation plan based on the campaign data from the content providers and the predicted number of views for the destination documents. The allocation plan can describe the optimal number of impressions for the recommendations that will be served on the various destination documents. For example, Content-Provider-A may have Recommendation-1 (e.g., online article) as part of a campaign. The allocation plan may indicate that "15,000 impressions" on Document-XYZ should be allocated to Recommendation-1. Implementations of creating an allocation plan are described in greater detail below in conjunction with FIG. 4 and FIG. 5.

At block 305, the server determines selection probabilities based on user activity data. The selection probabilities represent the likelihood that a user will select a recommendation that is served as an impression in the destination document based on the context of the user's current session with the destination document. The server can determine the selection probabilities in real time. The allocation plan may indicate that "5,000 impressions" on Document-XYZ should be allocated to Recommendation-1 and "10,000 impressions" on Document-XYZ should be allocated to Recommendation-2. The server can estimate how likely User-Jane-Doe will select each of the recommendations (e.g., Recommendation-1, Recommendation-2) in the allocation plan. For example, the server may determine that Recommendation-1 has a selection probability 231 of 5% and that Recommendation-2 has a selection probability 231 of 2%.

At block 307, the server calculates the grades for each of the recommendations in the allocation plan. The calculated grades induce a natural ranking of the recommendations by their grade value. The server can use the selection probabilities and additional recommendation parameters such as the maximum CPC a buyer (e.g., content provider) is willing to pay, to determine grades for the recommendation in the allocation. In one implementation, the grade is calculated as the product of the selection probability for the recommendation multiplied by the maximum or desired CPC for the recommendation.

At block 309, the server allocates the recommendations to the destination document and positions based on the allocation plan, grades and selection probabilities. The server can use the grades to determine lottery probabilities for the recommendations in the allocation plan. The lottery probability is the probability that a recommendation in the allocation plan may be selected for allocation to be served as an impression in a destination document. In one implementation, the server calculates the lottery probability for each of the recommendations in the allocation plan as a proportion of the grade of the particular recommendation to the total of the grades of the recommendations. In the preferred implementation, the server adjusts the proportion-based grade.

The server can use the lottery probabilities to allocate the recommendations to the destination documents. For example, the server may select the recommendations for allocation in order of lottery probability. For example, the server may allocate the recommendation having the highest lottery probability first and may position the recommendation that is allocated first in the most favorably position (e.g., top) in the allocation order.

At block 311, the server determines pricing for the recommendations based on the allocations (e.g., allocation order), recommendations parameters and allocation plan. One implementation of a grade-adjusted allocation and pricing method that encourages agents to use their true value as their maximum CPC bid is described below in conjunction with FIG. 6.

Figure 4:
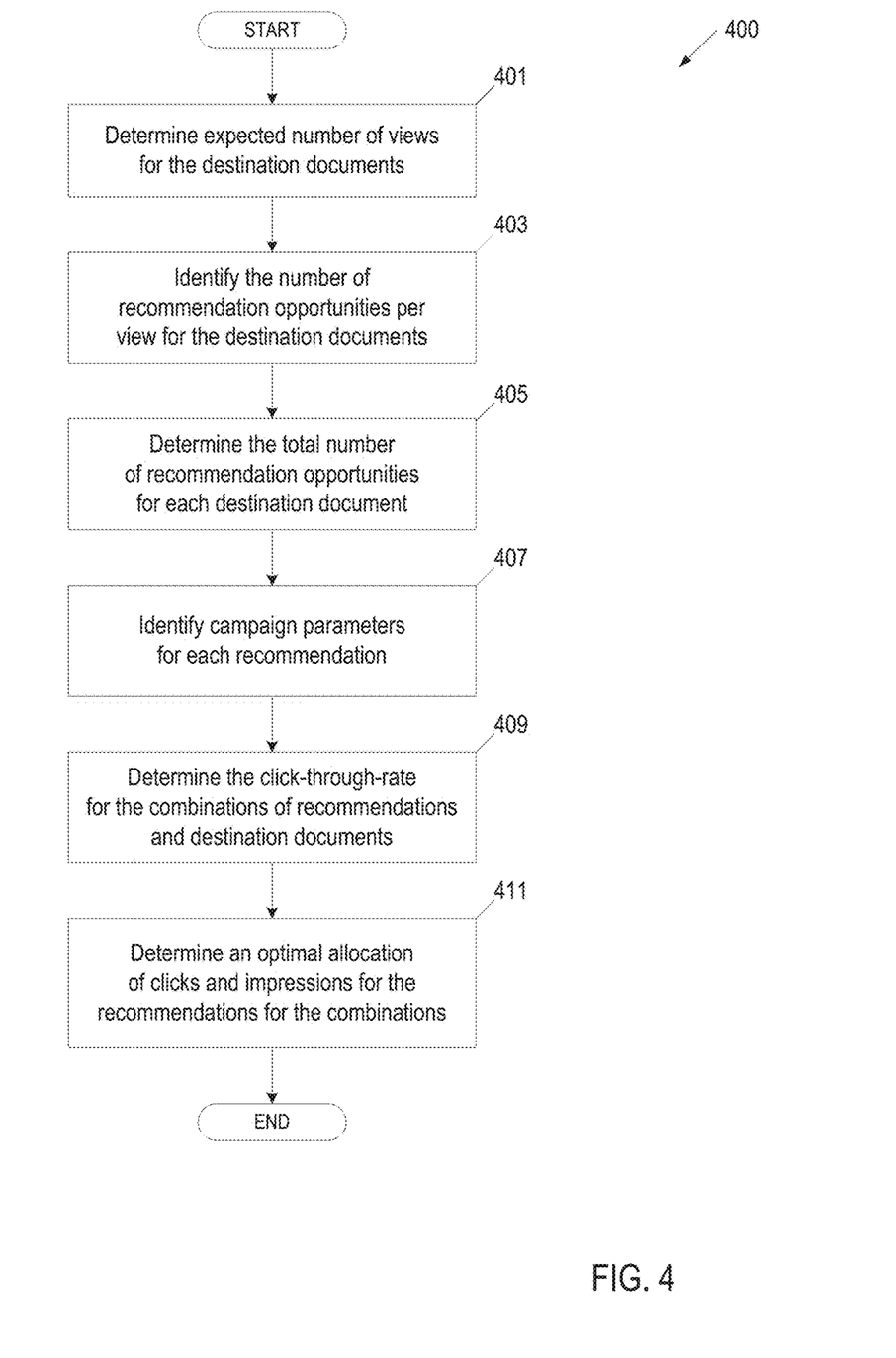
FIG. 4 is a flow diagram of an implementation of a method for creating an allocation plan.

FIG. 4 is a flow diagram of an implementation of a method 400 for creating an allocation plan. The method may be performed by processing logic that may comprise hardware (circuitry, dedicated logic, etc.), software (such as is run on a general purpose computer system or a dedicated machine), or a combination of both. In one implementation, the method 400 may be performed by the optimization module 145 hosted in a server 140 of FIG. 1 or by the optimization module 200 hosted in FIG. 2.

At block 401, the server determines the expected number of views for the destination documents. For example, the server may predict that Document-XYZ may have 5,000 views per day. In one implementation, the server uses user activity data, one or more prediction models, statistical analysis, etc. to determine the expected number of views for the destination document. In another example, the server may determine that Document-XYZ may have 1 million views per day. In another implementation, the server predicts the number of views for a destination document based on data for the subsections of a publisher network. For example, Document-XYZ may be in the news category and the sports news sub-category, and the data for the subsections of the publisher network may indicate there is an average number of views for the documents in the sports news subsection of 8,0000 views per day. The server may use the average of 8,0000 views per day as the predicted number of views per day for Document-XYZ.

At block 403, the server identifies the number of recommendation opportunities per view for the destination documents. The publishers may specify the number of recommendation opportunities (e.g., recommendation opportunities 155,165 in FIG. 1) per view for the destination documents. For example, the publisher GlobalNews, Inc. may specify that Document-XYZ (e.g., GlobalNews webpage) pertains to Subsection-Y (e.g., sub-category international news) and has three recommendation opportunities per view. In another example, the publisher EntertainmentNews, Inc. may specify that Document-DEF (e.g., EntertainmentNews webpage) pertains to Subsection-W (e.g., sub-category entertainment news) and has five recommendation opportunities per view.

At block 405, the server determines the total number of recommendation opportunities for each destination document. For example, the server may determine that the total number of recommendation opportunities for Document-XYZ for Subsection-Y is 15,000 recommendation opportunities, which is the product of 5,000 expected views per day multiplied by three recommendation opportunities per view. In another example, the server may determine that the total number of recommendation opportunities for Document-DEF for Subsection-W is 40,000 recommendation opportunities, which is the product of 8,000 expected views per day multiplied by five recommendation opportunities per view.

At block 407, the server identifies the campaign parameters associated with each recommendation. For example, Recommendation-1 may be from Content-Provider-A for Campaign-A. Content-Provider-A may have specified that Campaign-A has parameters that include a budget (B) of $1000 and a cost-per-click (CPC) of $1. In another example, Recommendation-2 may be from Content-Provider-B for Campaign-B. Content-Provider-B may have specified that Campaign-B has parameters that include a budget of $800 and a cost-per-click (CPC) of $2.

At block 409, the server determines a predicted CTR for the combinations of recommendations and destination documents. The predicted CTR represents the predicted rate that the recommendation will be selected at when served as an impression. The predicted CTR can be determined from user activity data that is stored in the data store. For example, the server may predict that upon Document-XYZ displaying Recommendation-1 from Content-Provider-A the combination may result in a predicted CTR of 4%.

At block 411, the server determines an optimal allocation of clicks and impressions for the recommendations for the combinations subject to the campaign parameters. A click hereinafter refers to a selection of an impression in a document. The selection may be made via an input device (e.g., touch screen, mouse, keyboard, motion sensor, remote control, voice, etc.). The server can use the budget B, CPC, CTR, and total number of recommendation opportunities for each combination (e.g., recommendation/document combination) to determine the optimal allocation of clicks. For example, Content-Provider-A may have agreed to pay the third party service provider a maximum budget B of $1000 and a maximum of $1 CPC. In another example, Content-Provider-B may have agreed to pay the third party service provider a maximum budget B of $800 and a maximum of $2 CPC.

The server can use linear programming to determine the optimal allocation of clicks and impressions for the recommendations based on the maximum budgets and maximum cost-per-clicks (CPCs). For example, let i be a destination document (e.g., Document-XYZ, Document-DEF) and j be a set of campaign parameters, which can include the budget ($B_j$) for the campaign and the cost per click ($CPC_j$) for the campaign. The server can use the click through rate ($CTR_{ij}$), campaign parameters, and total number of recommendation opportunities for a destination document i to determine, $N_{ij}$, the total number of impressions for a recommendation on destination document i, such that $N_{ij}$ does not exceed the budget $B_j$ and the $CPC_j$.

$$\Sigma_{ij} N_{ij} CPC_j CTR_{ij} \leq B_j \quad \text{(Constraint C1)}$$

$$\Sigma_{ij} N_{ij} \leq N_j \quad \text{(Constraint C2: inventory estimate)}$$

$$\max(\Sigma_{ij} N_{ij} CPC_j CTR_{ij}) \text{ Subject to constraints (Objective Function O1)}$$

For example, the server may use linear programming optimizes O1 subject to C1 and C2 to determine the optimal allocations of clicks and impressions ($N_{ij}$) for each recommendation. The allocation plan can be the optimal number of impressions ($N_{ij}$) for each recommendation.

Figure 5:
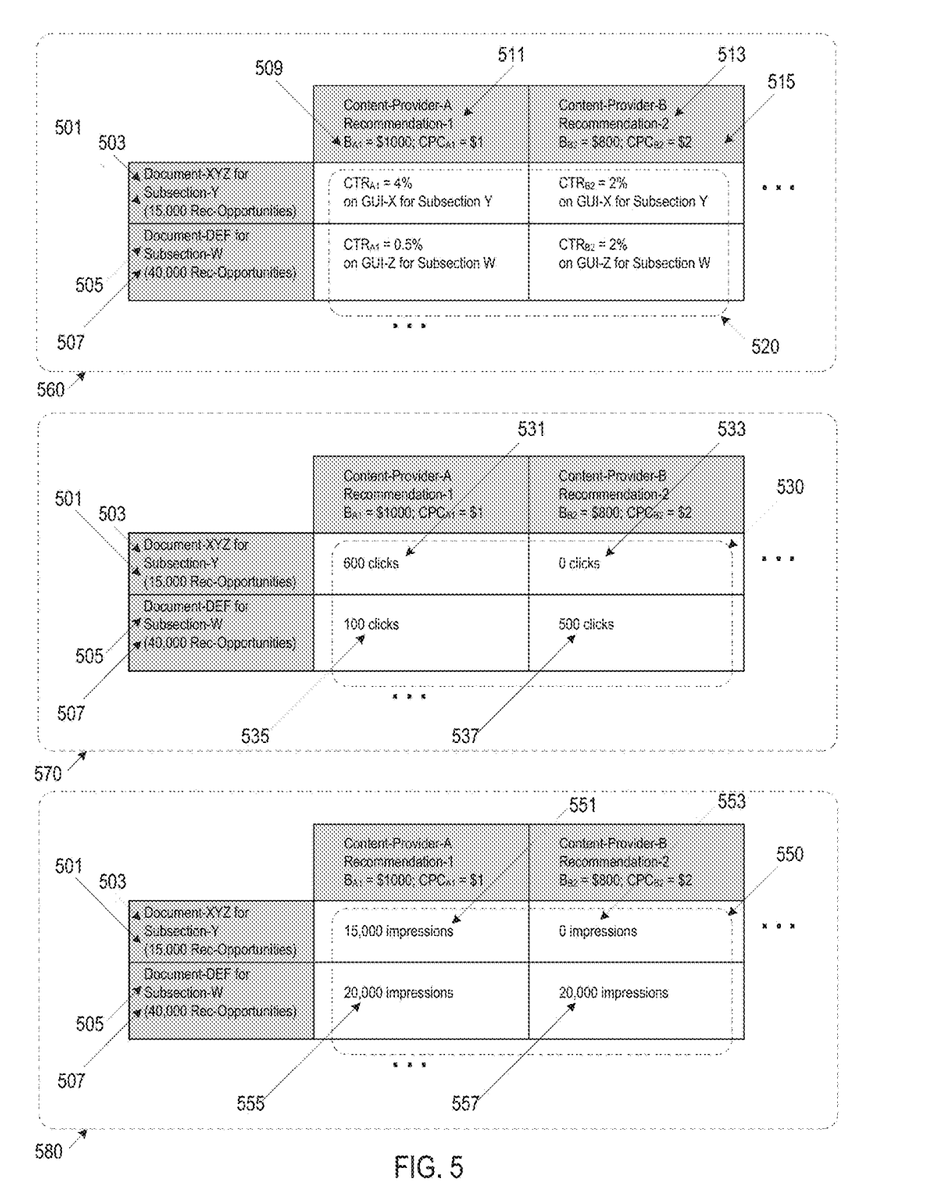
FIG. 5 illustrates an example of creating an allocation plan, according to various implementations.

FIG. 5 illustrates an example of creating an allocation plan 550, according to various implementations. The allocation plan 550 can specify the optimal number of impressions allocated to a recommendation (e.g., Recommendation-1, Recommendation, etc.). There can be multiple recommendations. For simplicity and brevity two recommendations 511,513 are shown. Portion 560 of FIG. 5 represents the inputs of the optimization module (e.g., optimization module 145 in FIG. 1, optimization module 200 in FIG. 2). Another portion 570 represents an intermediate solution in terms of clicks. Another portion 580 represents a translation of the intermediate solution to impression terms.

The server may use the campaign parameters (e.g., budgets, CPC, etc.) for the various campaigns to create the allocation plan 550. For example, Content-Provider-A may specify parameters 509 for a campaign that includes a budget of $1000 and a CPC of $1. In another example, Content-Provider-B may specify parameters 509 for a campaign that includes a budget of $800 and a CPC of $2. The server can associate the respective parameters with the various recommendations 511,515 from the content providers.

The server may use the total number of recommendation opportunities for the various destination documents to create the allocation plan 550. The total number of recommendation opportunities can be determined as the product of the number of expected views that is predicted for documents in a subsection of the publisher network multiplied by the number of recommendation opportunities on a destination document per view. For example, the server may determine that destination Document-XYZ 503 for Subsection-Y has 15,000 total recommendation opportunities 501. For example, the server may predict that Subsection-Y has 5,000 expected views and that there are three recommendation opportunities per view for Document-XYZ 503. In another example, the server may determine that destination Document-DEF 505 for Subsection-W has 40,000 total recommendation opportunities 507. For example, the server may predict that Subsection-W has 8,000 expected views and that there are five recommendation opportunities per view for Document-DEF 505.

The server can estimate the click-through-rates (CTRs) 520 for the various combinations of recommendations 511, 513 and destination documents 503,505. For example, the server may estimate that upon Document-XYZ 503 displaying Recommendation-1 511 from Content-Provider-A the document and recommendation combination may result in a CTR of 4%. In another example, the server may estimate that upon Document-XYZ 503 displaying Recommendation-2 513 from Content-Provider-B the document/recommendation combination may result in a CTR of 2%. In another example, the server may estimate that upon Document-DEF 505 displaying Recommendation-1 511 from Content-Provider-A the document/recommendation combination may result in a CTR of 0.5%. In another example, the server may estimate that upon Document-DEF 505 displaying Recommendation-2 513 from Content-Provider-B the combination may result in a CTR of 2%.

The server can determine an optimal number of clicks 530 and an optimal number of impressions 550 for the recommendations 511,513 for the various document/recommendation combinations. The allocation plan 550 is the optimal number of impressions 550 for the recommendations 511, 513 for the various document/recommendation combinations. The allocation plan 550 can include quotas (e.g., "15,000 impressions" 551, "0 impressions" 553, "20,000 impressions" 555, "20,000 impressions" 557) at the recommendation level. The server can use linear programming, and for example, Objection Function 1 subject to Constraint 1 and Constraint 2 above, to determine the optimal number of clicks 530 and the optimal number of impressions 550 while taking into account the budgets, CPCs, CTRs, and total number of recommendation opportunities.

For example, the server may determine that the optimal number of clicks 530 includes "600 clicks" to Recommendation-1 511 for Document-XYZ 503, "100 clicks" to Recommendation-1 511 for Document-DEF 505, "0 clicks" to Recommendation-2 513 for Document-XYZ 503, and "400 clicks" to Recommendation-2 513 for Document-DEF 505. For example, the server may determine that if all of the 15,000 recommendation opportunities 501 are allocated as "15,000 impressions" 551 to Recommendation-1 511, and there is a CTR of 4%, the number of clicks is (15,000)*(0.04)="600 clicks" 531. If all of the 15,000 recommendation opportunities 501 are allocated to Recommendation-1 511, then "0 impressions" 553 for Document-XYZ 503 would be allocated to Recommendation-2 515, resulting in "0 clicks" 533 for Recommendation-2 513 for Document-XYZ 503. If Content-Provider-B has a budget B of $800 and a CPC of $2, then the number of clicks is $800/$2="400 clicks" 537, which may all be allocated to Recommendation-2 513 for Document-DEF 505.

If "400 clicks" 537 are allocated to Recommendation-2 513 for Document-DEF 505, the number of impressions allocated to Recommendation-2 513 for Document-DEF 505 is the number of clicks divided by the CTR, which is (400 clicks)/(0.02)="20,000 impressions" 557. If Document-DEF 505 has a total number of recommendation opportunities of "40,000 recommendation opportunities" 507 and "20,000 impressions" 557 are allocated to Recommendation-2 513, then the remaining "20,000 impressions" 555 can be allocated to Recommendation-1 511.

The allocation of the "20,000 impressions" 555 for Document-DEF 505 to Recommendation-1 511 can result in "100 clicks" 535. If the CPC is $1 and there are "100 clicks" 535, then Content-Provider-A should pay $100 (e.g., (20,000)*(0.5%)*($1)=$100) to the third party service provider. With the allocation plan 550, Content-Provider-A is predicted to pay $100 for the 20,000 impression quota for Document-DEF 505 and $600 (e.g., (15,000)*(4%)*($1)=$600) for the 15.000 impression quota for Document-XYZ 503, which is a total of $700 and less than the overall budget B of $1000 for Content-Provider-A. With the allocation plan 550, Content-Provider-B is predicted to pay $0 for the "0 impressions" 553 quota for Document-XYZ 503 and $800 (e.g., (20,000)*(2%)*($2)=$600) for the 20,000 impression quota for Document-DEF 505, which is a total of $800 and equal to the overall budget B of $800 for Content-Provider-B.

Figure 6:
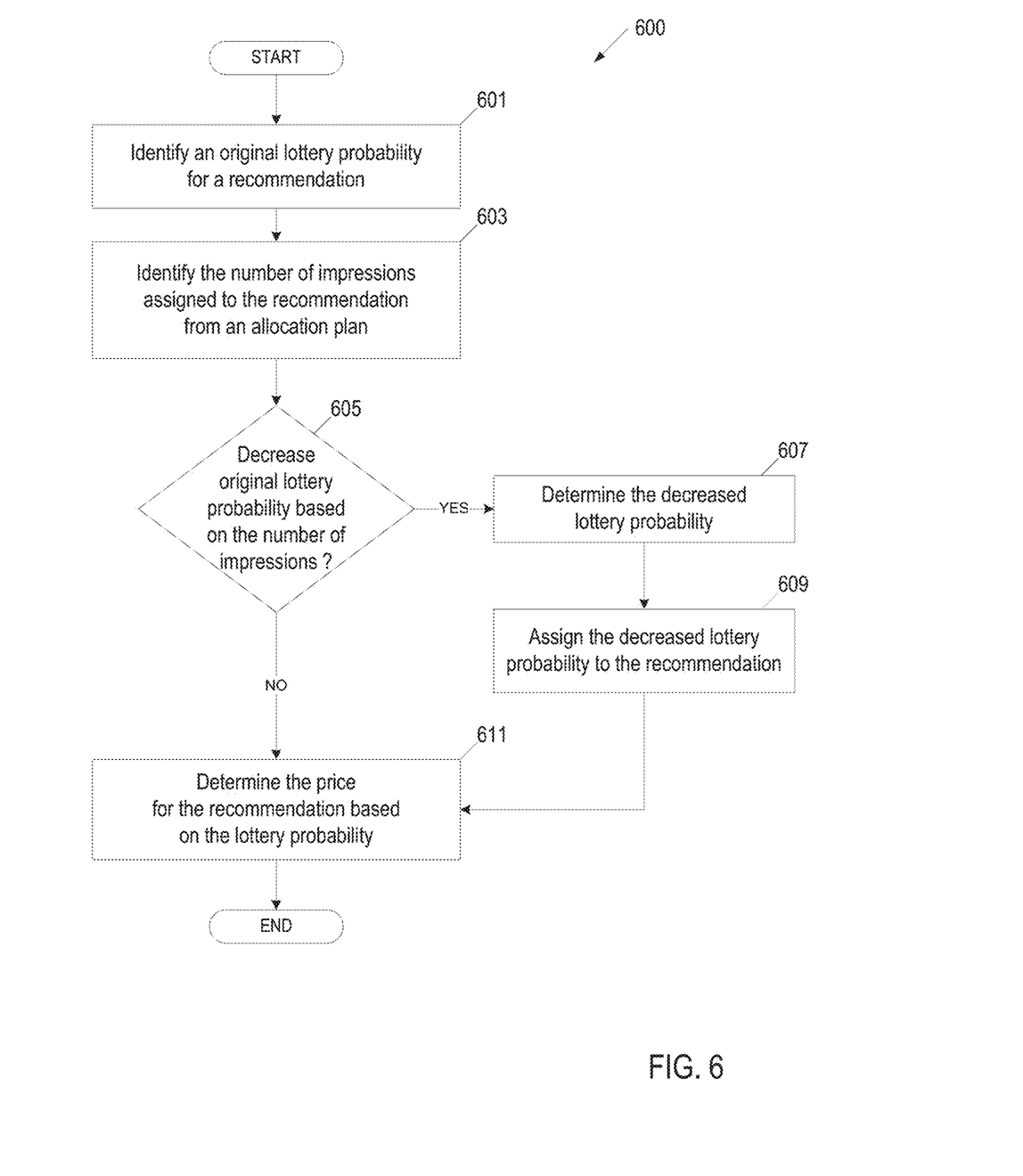
FIG. 6 is a flow diagram of one implementation of a method for determining the pricing for recommendations.

FIG. 6 is a flow diagram of one implementation of a method 600 for determining the allocation and pricing for recommendations. The method may be performed by processing logic that may comprise hardware (circuitry, dedicated logic, etc.), software (such as is run on a general purpose computer system or a dedicated machine), or a combination of both. In one implementation, the method 600 may be performed by the optimization module 145 hosted in a server 140 of FIG. 1 or by the optimization module 200 hosted in FIG. 2, and especially module 203 of FIG. 2.

The method 600 implements a grade-adjusted allocation and pricing mechanism that encourages agents to use their true value as their maximum CPC (Max-CPC) bid. Method 600 can encourage buyers (e.g., content providers) to specify a maximum CPC in the campaign parameters that is close to the buyer's actual value of a click. The server can adjust the grades that are assigned to the recommendations and can determine prices for the recommendations according to the actual demand reflected through the allocation list (e.g., allocation list generated in block 307 in FIG. 3).

At block 601, the server identifies a grade for each recommendation and derives from it a lottery probability (e.g., assigned in block 309 in FIG. 3) for a recommendation. In one implementation, the server calculates the lottery probability (p) for the recommendation as a proportion of the grade of the particular recommendation to the total of the grades of the recommendations. For example, the grade ($p_i$) for Recommendation-1 may be $$p_1 = \frac{7}{12} = 0.58.$$

At block 603, the server identifies the number of impressions ($N_i$) assigned to the recommendation for a particular destination document from an allocation plan. For example, the number of impressions ($N_1$) for Recommendation-1 for Document-DEF may be $N_1$=20,000.

At block 605, the server determines whether the expected number of impressions for the recommendation is more than requested by the plan, in which case the server would need to decrease the original lottery probability so the expected number of impressions matches the number of impressions ($N_i$) from the allocation plan. Let N be the total number of recommendation opportunities for the destination document. For example, for Document-DEF, N=40,000. The server can use Statement 1 and Statement 2 to determine whether to decrease the original grade.

If $(p_i \times N) \geq N_i$, then determine decreased lottery probability $p'_i$ (Statement 1)

If $(p_i \times N) < N_i$, then do not decrease lottery probability $p_i$ (Statement 2)

If the server should decrease the original lottery probability, the server determines the decreased lottery probability at block 607 and assigns the decreased lottery probability to the recommendation at block 609. For example, for Recommendation-1 for Document-DEF, let:

$N = 40{,}000$, $N_1 = 20{,}000$, and $p_1 = \frac{7}{12} = 0.58$ (Statement 3)

$p_1 \times N = 0.58 \times 40{,}000 = 23{,}200$ (Statement 4)

$p'_1 = \frac{N_1}{N} = \frac{20{,}000}{40{,}000} = 0.50$ (Statement 5)

The server may determine for Recommendation-1 for Document-DEF that $p_1 \times N \geq N_1$ (e.g., 0.58≥0.50) and can determine the decreased lottery probability at block 607. In one implementation, the server determines the decreased lottery probability to be:

$\frac{N_1}{N}$ = decreased lottery probability $p'_1$ (Statement 6)

For example, the server may determine the decreased lottery probability, $p'_1$, for Recommendation-1 for Document-DEF is $$\frac{N_i}{N} = \frac{20{,}000}{40{,}000} = 0.50$$

and can assign the decreased lottery probability as $p_i$ to Recommendation-1 for Document-DEF at block 609.

At block 611, the server determines the prices for the recommendation based on the lottery probability. In one implementation, the server determines the price for Recommendation-i using Equation 1:

$$\text{Price}(i) = MaxCPC_i \times \left(\frac{N_i}{N \times p_i}\right) \text{ if the}$$ (Eq. 1)

lottery probability was decreased (see *stmt*. 1)

Price(i)=MaxCPC$_i$ if the lottery probability was not decreased (see stmt. 2)

For example, for Recommendation-1 for Document-DEF, discussed above with p1=0.58 and p1'=0.5; let Max-CPC$_1$=$1. The server may determine that the price for Recommendation-1 is:

$$\text{Price}(1) = \$1 \times \left(\frac{20{,}000}{40{,}000 \times 0.58}\right) = \$0.86$$ (Statement 7)

Figure 7:
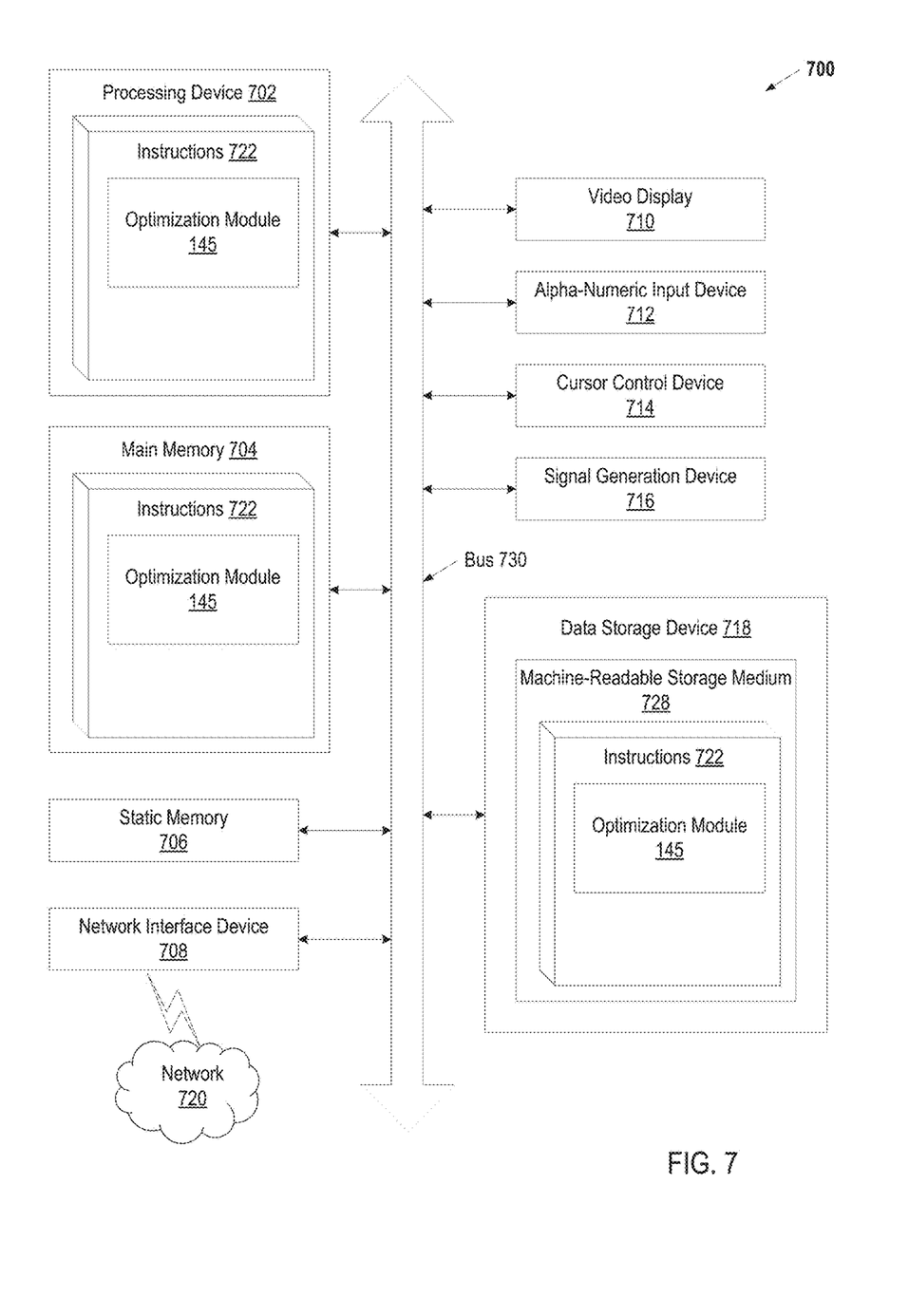
FIG. 7 is a block diagram of an example computer system that may perform one or more of the operations described herein, in accordance with various implementations.

FIG. 7 is a block diagram of an example computer system 700 that may perform one or more of the operations described herein, in accordance with various implementations In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 714, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 722 for performing the operations and steps discussed herein.

The computer system 700 may further include a network interface device 704. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 714 may include a computer-readable storage medium 724 on which is stored one or more sets of instructions 722 (e.g., software) embodying any one or more of the methodologies or functions described herein. The instructions 722 may also reside, completely or at least partially, within the main memory 704 and/or within the processor 702 during execution thereof by the computer system 700, the main memory 704 and the processor 702 also constituting computer-readable storage media. The instructions 722 may further be transmitted or received over a network 720 via the network interface device 708.

In one implementation, the instructions 722 include instructions for an optimization module (e.g., optimization module 145 in FIG. 1) and/or a software library containing methods that call the optimization module. While the computer-readable storage medium 728 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "ranking", "allocating", "providing", "assigning", "creating", "selecting", "pricing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving campaign data from a first content provider, wherein the campaign data comprises a set of content links, a target cost per click for the set of content links, and a budget amount selected by the first content provider;
creating an allocation plan comprising assignments of the set of content links for display in a plurality of documents, wherein the allocation plan comprises a target number of impressions for the set of content links;
collecting user activity data associated with a first user;
determining a first user-specific selection probability corresponding to a first content link of the set of content links based on the user activity data associated with the first user, wherein the first user-specific selection probability represents a calculated probability of serving content in response to an interaction by the first user with the first content link;
assigning, to the first content link, a first grade representing a product of the first user-specific selection probability associated with the first user and the first content link and the target cost per click selected by the first content provider;
determining pricing for provisioning the first content link to one or more of the plurality of documents;
generating a plurality of sub-categories to classify the plurality of documents;
determining, using a first prediction model, a predicted number of views for a first document of the plurality of documents, wherein the predicted number of views is based on an average number of views of a first set of documents in a first sub-category comprising the first document;
allocating, by a processing device, the first content link to the first document based on the first grade, the allocation plan, the pricing, the predicted number of views, and the first user-specific selection probability; and
in response to the first user requesting the first document, causing, based on the allocating, the first content link to be served via a designated portion of the first document delivered to the first user.

2. The method of claim 1, further comprising:
generating a ranking of a plurality of recommendations based on a plurality of grades; and
providing the ranking to a distribution system to serve the plurality of recommendations to one or more servers providing the plurality of documents.

3. The method of claim 2, wherein the allocating comprises:
determining a first lottery probability of the first content link being selected in a lottery based on the first grade, wherein the allocating is further based on the first lottery probability.

4. The method of claim 3, wherein determining the first lottery probability comprises:
determining a proportion of the first grade to a total of the plurality of grades.

5. The method of claim 3, wherein determining pricing for provisioning the first content link comprises:
determining a decrease to the first lottery probability for the first content link; and
determining an adjusted price for provisioning of the first content link based on the decrease to the first lottery probability.

6. A system comprising: a memory to store instructions; and
a processing device operatively coupled with the memory, the processing device to execute the instructions to:
receive campaign data from a first content provider, wherein the campaign data comprises a set of content links, a target cost per click for the set of content links, and a budget amount selected by the first content provider;
create an allocation plan comprising assignments of the set of content links for display in a plurality of documents, wherein the allocation plan comprises a target number of impressions for the set of content links;
collect user activity data associated with a first user;
determine a first user-specific selection probability corresponding to a first content link of the set of content links based on the user activity data associated with the first user, wherein the first user-specific selection probability represents a calculated probability of serving content in response to an interaction by the first user with the first content link;
assign, to the first content link, a first grade representing a product of the first user-specific selection probability associated with the first user and the first content link and the target cost per click selected by the first content provider;
determine pricing for provisioning the first content link to one or more of the plurality of documents;
generate a plurality of sub-categories to classify the plurality of documents; determine, using a first prediction model, a predicted number of views for a first document of the plurality of documents, wherein the predicted number of views is based on an average number of views of a first set of documents in a first sub-category comprising the first document;
allocate, by a processing device, the first content link to the first document based on the first grade, the allocation plan, the pricing, the predicted number of views, and the first user-specific selection probability; and
in response to the first user requesting the first document, cause, based on allocating the first content link to the first document, the first content link to be served via a designated portion of the first document delivered to the first user.

7. The system of claim 6, wherein the processing device executes the instructions to:
generate a ranking of a plurality of recommendations based on a plurality of grades; and
provide the ranking to a distribution system to serve the plurality of recommendations to one or more servers providing the plurality of documents.

8. The system of claim 7, the processing device to execute the instructions to:
determine a first lottery probability of the first content link being selected in a lottery based on the first grade, wherein the allocating is further based on the first lottery probability.

9. The system of claim 8, the processing device to execute the instructions to:
determine a decrease to the first lottery probability for the first content link; and
determine an adjusted price for provisioning of the first content link based on the decrease to the first lottery probability.

10. A non-transitory computer readable storage medium e comprising instructions that, in response to execution by a processing device, cause the processing device to perform operations comprising:
  receiving campaign data from a first content provider, wherein the campaign data comprises a set of content links, a target cost per click for the set of content links, and a budget amount selected by the first content provider;
  creating an allocation plan comprising assignments of the set of content links for display in a plurality of documents, wherein the allocation plan comprises a target number of impressions for the set of content links;
  collecting user activity data associated with a first user;
  determining a first user-specific selection probability corresponding to a first content link of the set of content links based on the user activity data associated with the first user, wherein the first user-specific selection probability represents a calculated probability of serving content in response to an interaction by the first user with the first content link;
  assigning, to the first content link, a first grade representing a product of the first user-specific selection probability associated with the first user and the first content link and the target cost per click selected by the first content provider;
  determining pricing for provisioning the first content link to one or more of the plurality of documents;
  generating a plurality of sub-categories to classify the plurality of documents; determining, using a first prediction model, a predicted number of views for a first document of the plurality of documents, wherein the predicted number of views is based on an average number of views of a first set of documents in a first sub-category comprising the first document;
  allocating, by a processing device, the first content link to the first document based on the first grade, the allocation plan, the pricing, the predicted number of views, and the first user-specific selection probability; and
  in response to the first user requesting the first document, causing, based on the allocating, the first content link to be served via a designated portion of the first document delivered to the first user.

11. The non-transitory computer readable storage medium of claim 10, the operations further comprising:
  generating a ranking of a plurality of recommendations based on a plurality of grades; and
  providing the ranking to a distribution system to serve the plurality of recommendations to one or more servers providing the plurality of documents.

* * * * *